Oct. 10, 1944. C. D. KNOWLTON ET AL 2,359,922
MACHINE FOR TREATING HIDES, SKINS AND LEATHER
Filed Aug. 24, 1942 8 Sheets-Sheet 2

INVENTORS

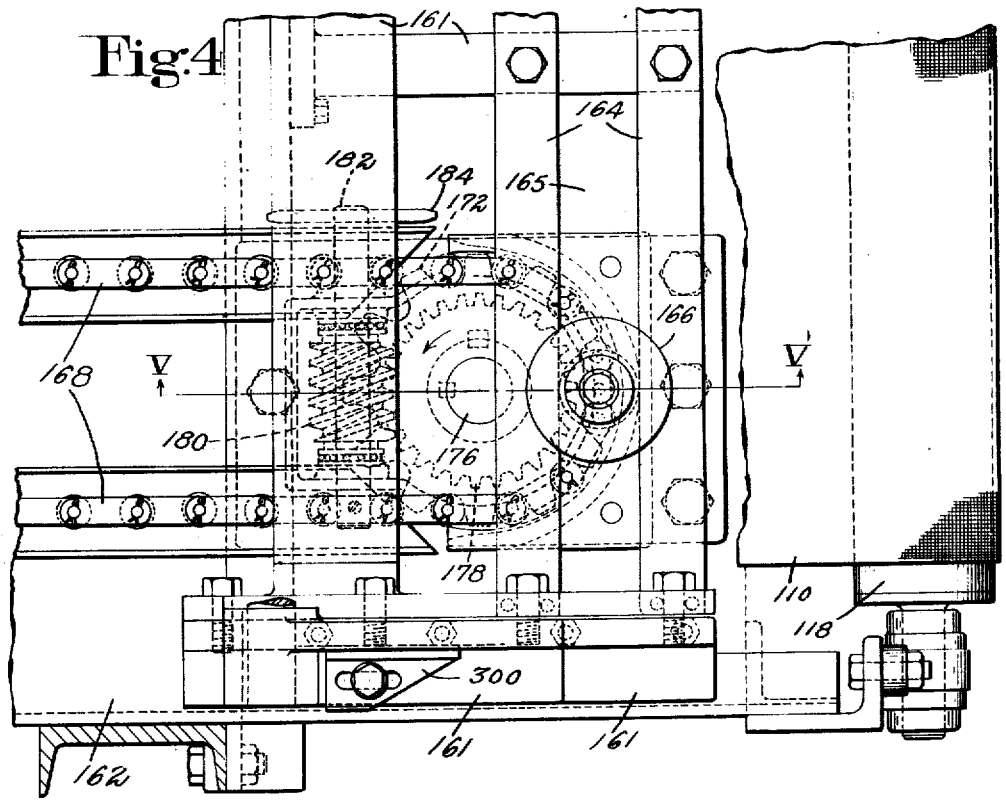
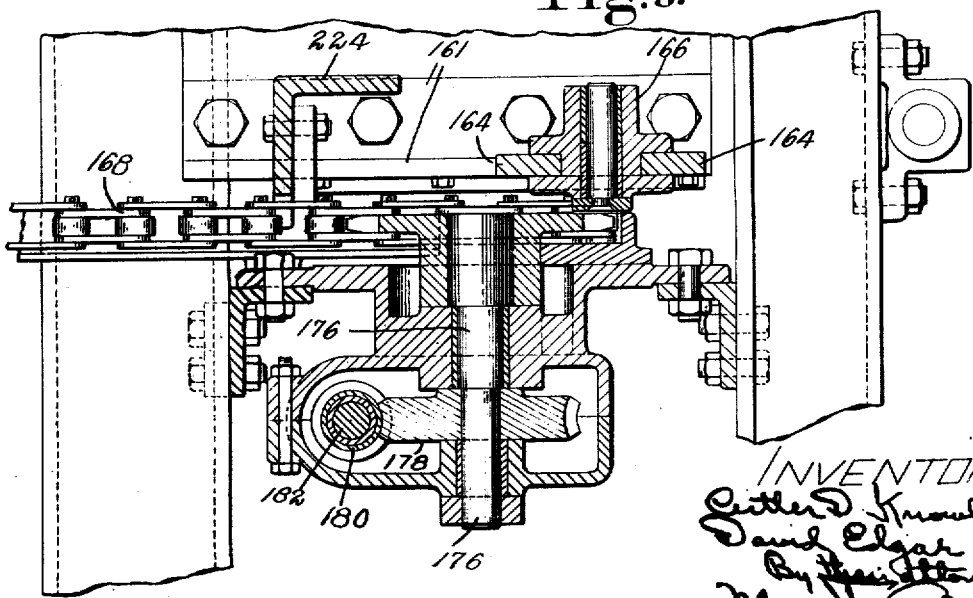

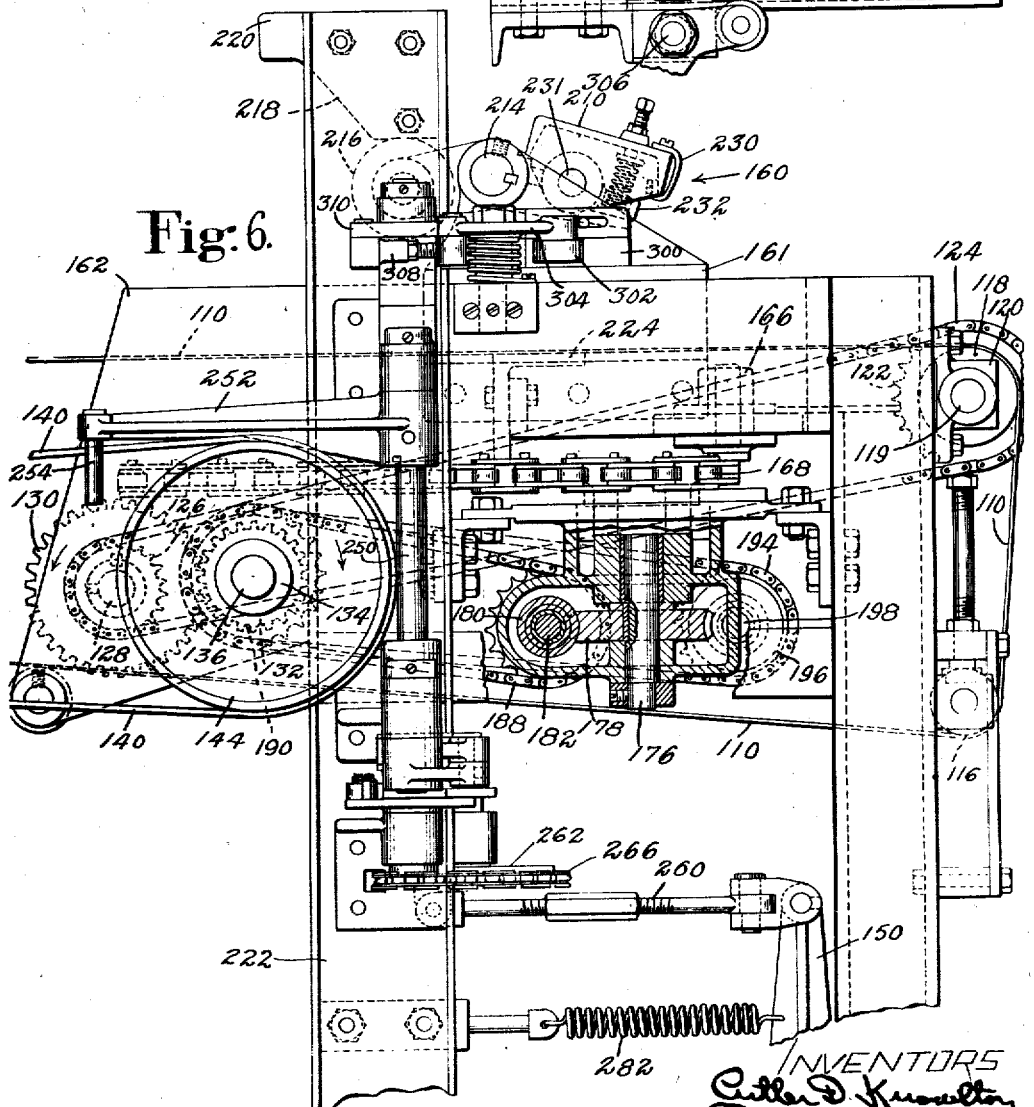

Oct. 10, 1944.   C. D. KNOWLTON ET AL   2,359,922
MACHINE FOR TREATING HIDES, SKINS AND LEATHER
Filed Aug. 24, 1942   8 Sheets-Sheet 6
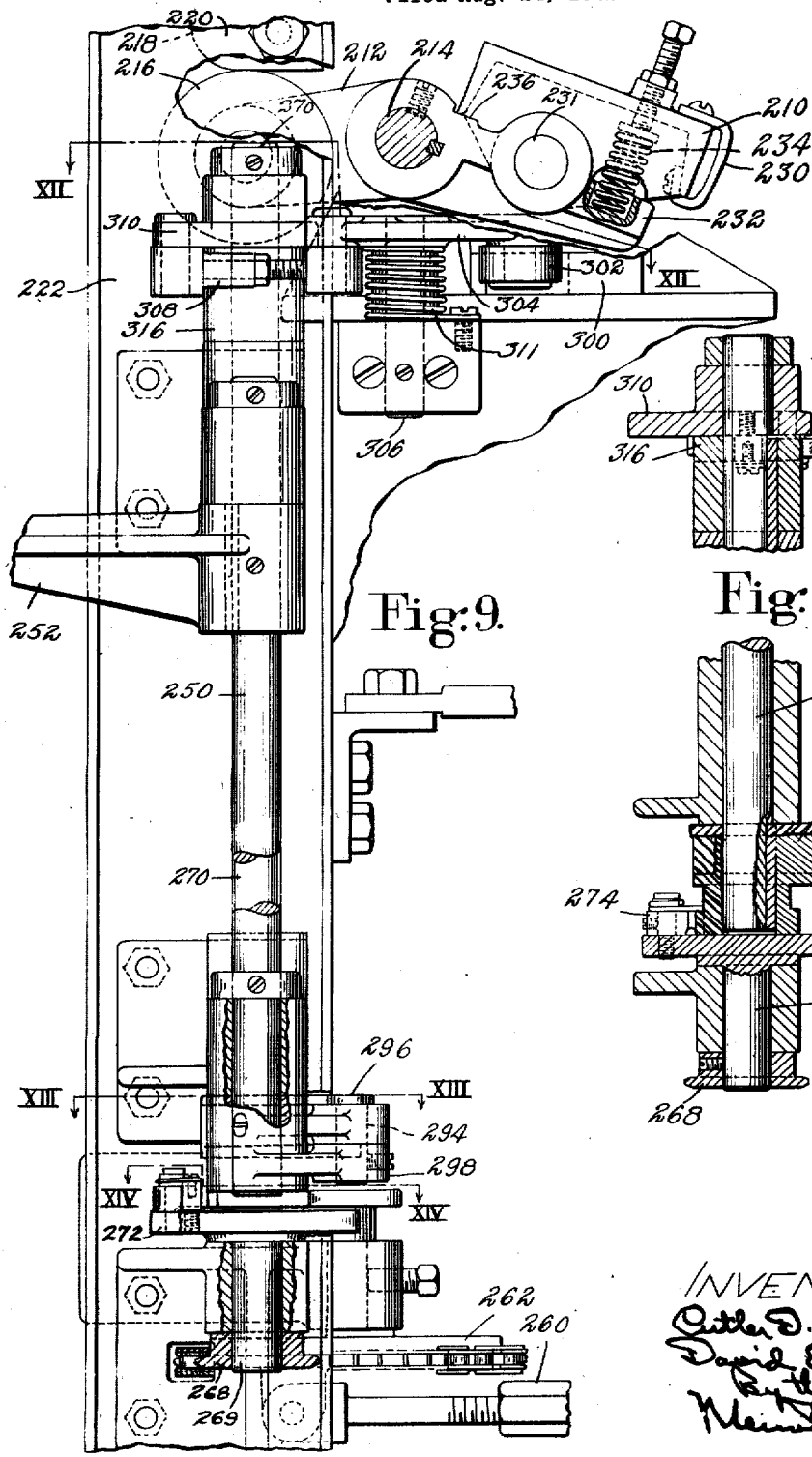
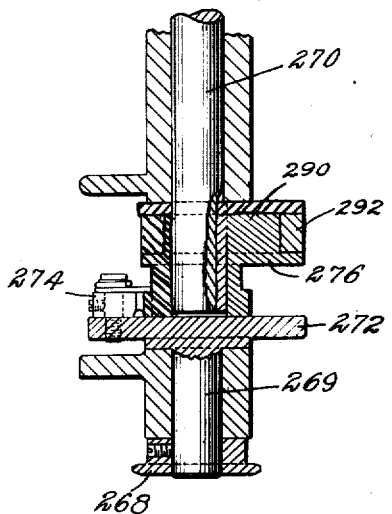
Fig. 9.   Fig. 10.   Fig. 11.
INVENTORS Oct. 10, 1944.  C. D. KNOWLTON ET AL  2,359,922
MACHINE FOR TREATING HIDES, SKINS AND LEATHER
Filed Aug. 24, 1942  8 Sheets-Sheet 7
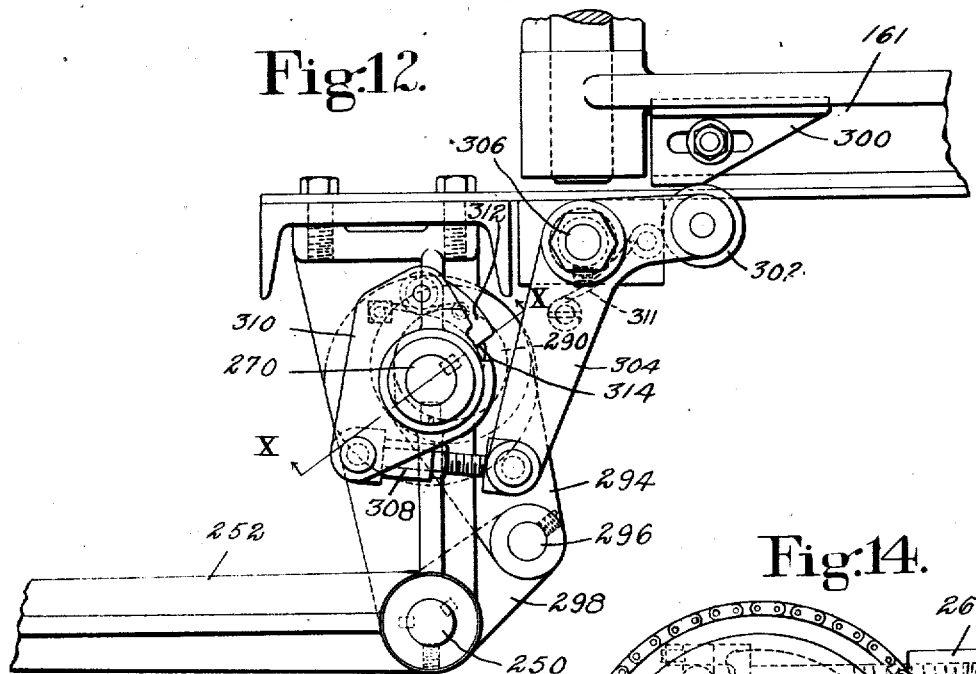
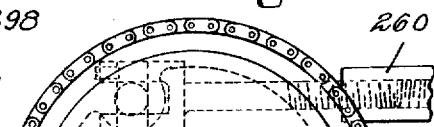
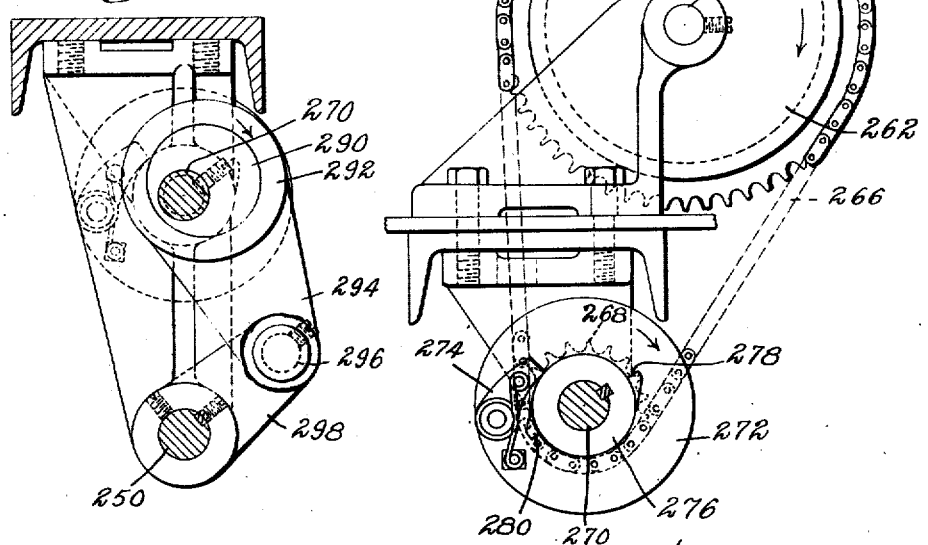
INVENTORS
Cutler D. Knowlton
David Edgar
By their Attorney

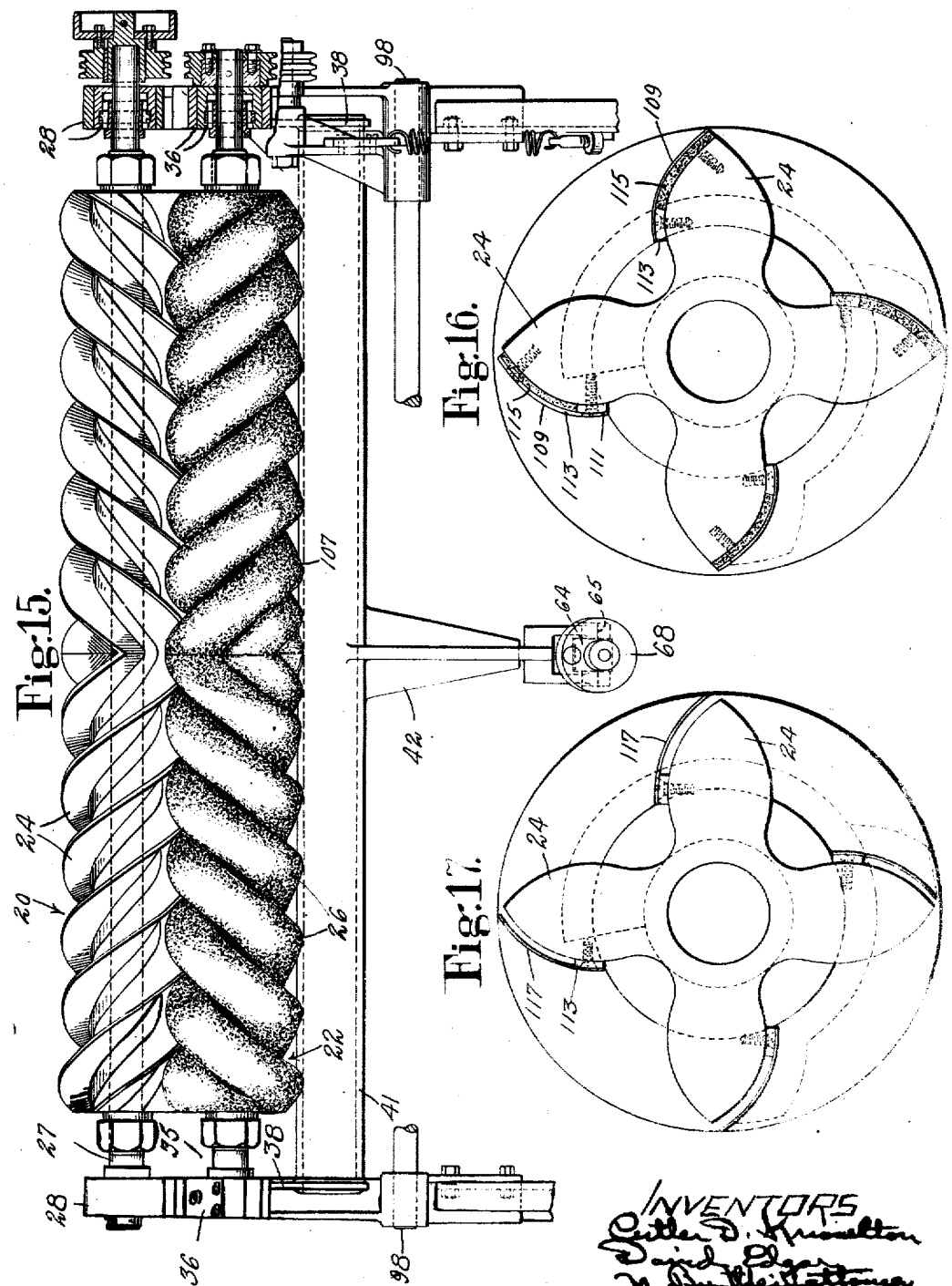

Patented Oct. 10, 1944

2,359,922

UNITED STATES PATENT OFFICE 2,359,922

MACHINE FOR TREATING HIDES, SKINS, AND LEATHER

Cutler D. Knowlton, Rockport, and David Edgar, Lynn, Mass., assignors to United Shoe Machinery Corporation, Flemington, N. J., a corporation of New Jersey Application August 24, 1942, Serial No. 455,902

21 Claims. (Cl. 69—34)

This invention relates to machines for treating hides, skins and leather. While the invention is herein illustrated as embodied in a machine for performing staking operations upon tanned hides and skins, it is to be understood that in various novel and useful aspects the invention is not limited to use in machines of the illustrated type.

Staking machines of the type now used in tanneries of this and other countries commonly employ a blade and cooperating members for bending a certain limited portion of the hide or skin over the blade, in an arrangement in which there is relative movement between the blade and the work piece in one direction to effect staking treatment of such limited hide or skin portion With such a machine, the work must be shifted and reintroduced into the grip of the blade and its cooperating members for treatment of an adjacent portion of the work piece, these operations being repeated many times to complete treatment of the whole surface of the work piece.

It is an object of this invention to provide a machine for aiding the operator in spreading out work pieces to be treated and for treating both sides of a given work piece throughout the full length or width dimension thereof at one introduction into the machine, completion of the treatment of such work piece being accomplished by reversing it and introducing it a second time for the treatment of the part remaining untreated after the first machine operation. It is a further object of the invention to provide a machine to spread out work pieces to be treated and whereby an operator may initiate the treatment of a given work piece when satisfied that such work piece is adequately spread out. Further objects of the invention are to provide a highly efficient machine of simple construction for performing staking operations upon hides and skins, it being understood that machines embodying the same principles of construction may find other uses and applications, such, for instance, as in brushing and buffing operations.

Another feature of the invention resides in the special work feeding means provided for controlling the rate of feed of the work piece to and from the treating tools by which a yielding holding pressure is maintained on the same small area of the work piece during such feed and which means permits treatment of both sides of the work piece by the tools. In the illustrated construction, the work feeding means comprises a conveyor belt for supporting a work piece in extended condition in an arrangement in which said conveyor belt is spaced with respect to work treating members and has its operative work supporting run ending closely adjacent to said members and to the treatment zone between them. It follows that the work piece is introduced into the work treating members in such manner that it may be subjected to treatment upon both surfaces thereof. Such an arrangement is specially useful in staking operations where the hide or skin must be bent repeatedly and sharply about the edges of blades to secure softening and stretching thereof.

A special feature of the invention is the combination of a feeding conveyor belt, means to clamp a work piece thereon, and two meshing work rolls, the conveyor belt being arranged to feed the work piece to the bite of the rolls first in one direction and then in the other direction giving double treatment to both sides of the work piece.

Still another feature of the invention is incorporated in the bladed work treating rolls which are arranged to mesh with each other, one of said rolls being covered with a yielding material and the other having blades of substantial rigidity but with such blades being provided with resilient or yielding means for contacting the work pieces. This provision is for the purpose of preventing injury to the work pieces and yet permit adequate treatment of them.

Preferably, and as shown, a work clamping device is associated with the conveyor belt to hold the work piece against displacement relatively to the belt. Conveniently, driving means is provided for the belt under the control of the operator so that the belt may be driven to spread out the work piece while one end of the latter is held by the operator. At the proper time the work clamping device is brought into operation to clamp the work on the conveyor belt, and at the same time the driving means for the belt is disconnected and a driving mechanism for the work clamping device is put into operation, so that the belt is driven, with the work piece clamped thereto, first in one direction and then in the reverse direction by the said driving mechanism.

Another feature of importance resides in the provision of means for automatically releasing the work clamping means when the latter returns to its initial position at the end of the reverse travel of the conveyor belt. A simple and efficient construction for driving the belt through the work clamping device resides in the provision of endless belts turning about vertical shafts and arranged to be driven by power means under the control of the operator, in an arrangement in which a belt shipper is provided for shifting the drive from suitable power means alternately to the conveyor belt and to the work clamping device.

These and other important features of the invention, and novel combinations of parts, will now be described in detail in the specification and then pointed out more particularly in the appended claims.

In the drawings,

Fig. 4 is an enlarged view of a chain drive mechanism, the view being in plan and corresponding to the right sprocket wheel and associated parts adjacent to the belt shipper in Fig. 2;

Fig. 5 is a vertical sectional view taken along the line V—V of Fig. 4;

Fig. 6 is a view, partly in elevation and partly in section, of the right end of the machine shown in Fig. 1;

Fig. 7 is a detail of the work clamping device and of the cam mechanism for operating the belt shipper;

Fig. 8 is a detail of the chain drive for the work clamping slide;

Fig. 9 is a detail view of the vertical shaft and associated parts serving as a belt shipper mechanism;

Fig. 10 is a sectional view taken along the line X—X of Fig. 12;

Fig. 11 is a detail sectional view of the lower end of the ratchet shaft shown in Fig. 9;

Fig. 12 is a sectional view taken along the line XII—XII of Fig. 9;

Fig. 13 is a sectional view along the line XIII—XIII of Fig. 9;

Fig. 14 is a sectional view taken along the line XIV—XIV of Fig. 9;

Fig. 15 is a view of the cooperating bladed members which operate upon the work;

Fig. 16 is a detail view of a modification of the lower rotary work treating member showing a specially constructed yielding surface for accommodating variations in the thickness of the work piece;

Fig. 17 is a view similar to that of Fig. 16 showing still another species of a yielding surface; and Fig. 18 is a somewhat diagrammatic end view of the cooperating cylinders shown in Fig. 15.

Figure 1:
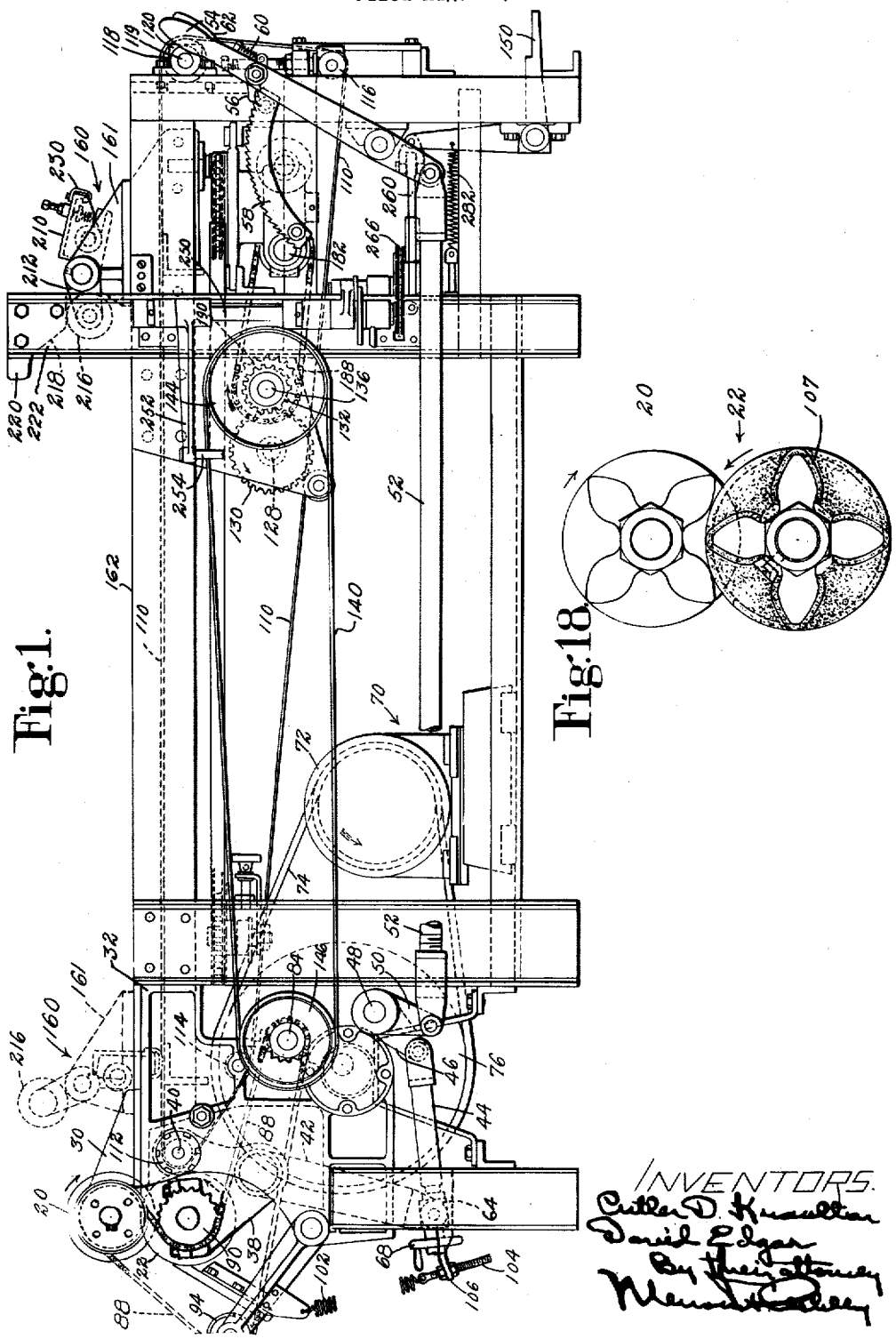
Fig. 1 is a view in side elevation of a staking machine showing one embodiment of the invention.

In the illustrated machine, which is specially designed for staking operations upon tanned hides and skins, there is provided a pair of rotary work treating members 20, 22 (Figs. 1, 3 and 15) the upper member 20 having helically arranged blades 24 extending in opposite directions from a substantially central point or line in the length of the rotary member or cylinder. As will be clearly seen from Fig. 15, the lower work treating or presser member 22 has helically arranged pressure applying ribs 26 which mesh with the helically arranged blades 24 of the work treating member or cylinder 20. It will be readily understood that a hide or skin, while being drawn through between the work treating members 20, 22 will be thoroughly worked since it is being bent and stretched in many directions due to the interaction of the helically arranged blades and ribs.

Figure 2:
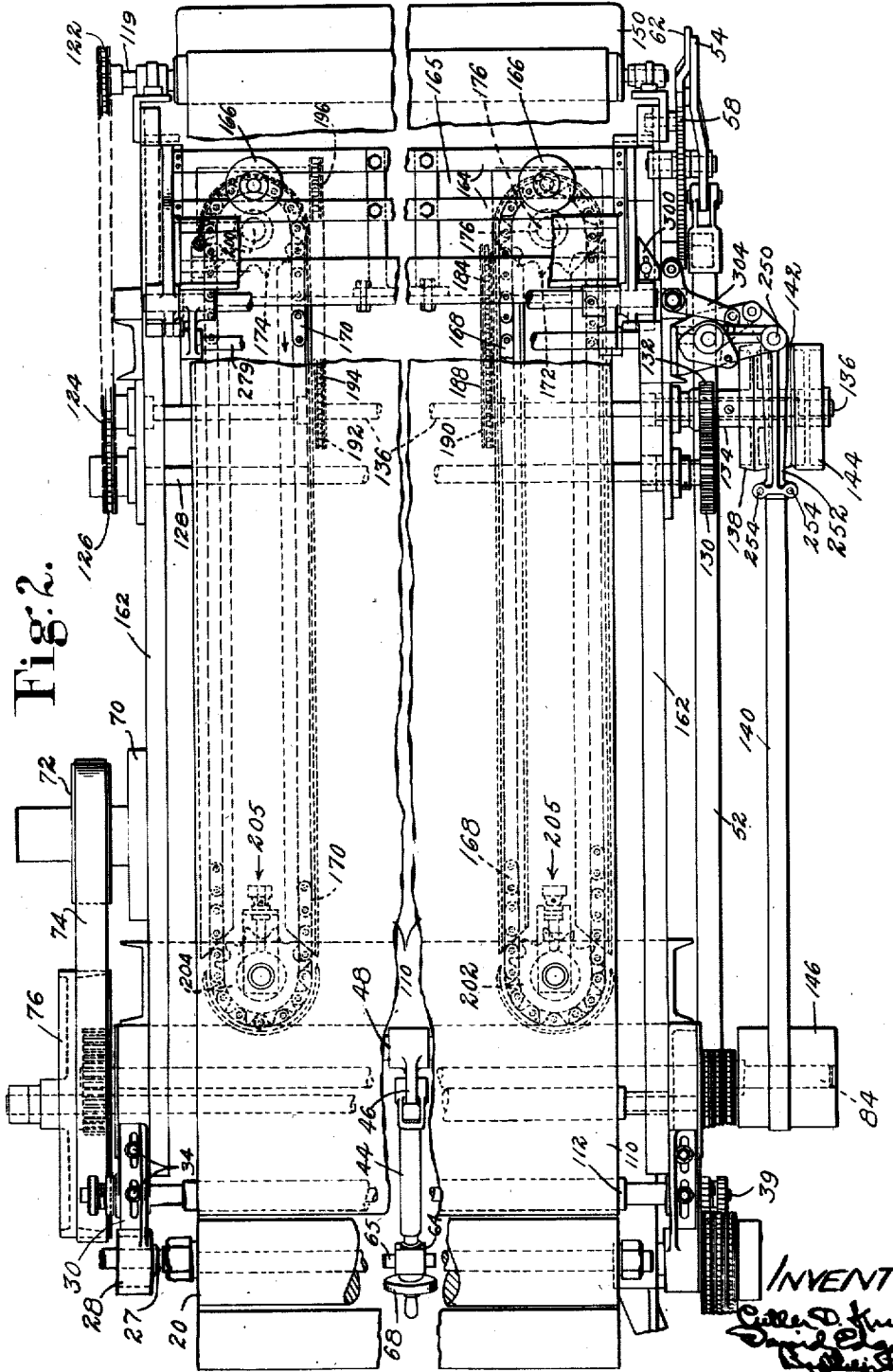
Fig. 2 is a top plan view of the machine shown in Fig. 1.
Figure 3:
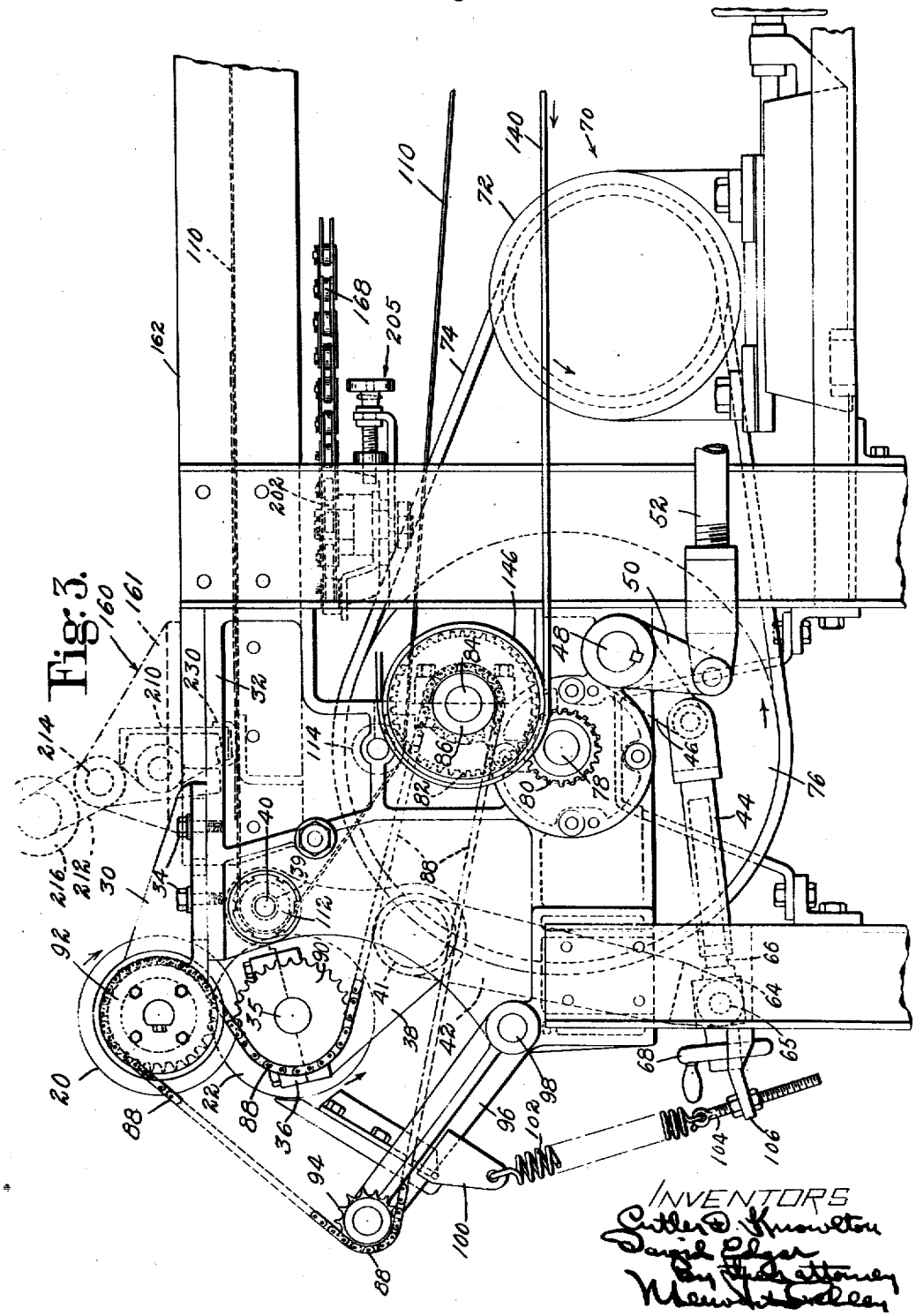
Fig. 3 is a view in side elevation, on a larger scale, of the left end of the machine shown in Fig. 1.

As most clearly shown in Figs. 2, 3 and 15, the work treating roll or cylinder 20 has its shaft 27 mounted in bearings 28 carried by brackets 30 at each end of the cylinder 20, said brackets being mounted for adjustment on frame 32 of the machine, the adjustment being accomplished by the provision of slots in the brackets 20 in which are seated bolts 34 (Figs. 2 and 3). The lower work treating roll 22 has its shaft 35 mounted at each end in bearings 36 carried at the upper ends of a pair of arms 38 (Figs. 1, 3 and 15), each pivoted on a rod 39 the axis of which is indicated at 40 in Figs. 1 and 3, in an arrangement in which each arm 38 is fastened to a pipe 41 having fixedly secured to its middle portion (Fig. 15) a downwardly extending lever 42 to the lower end of which is pivoted a link 44 pivoted at its other end to an arm 46 secured to a rock shaft 48 having secured to its outer end a second arm 50 to the end of which is pivoted a long link or connecting rod 52 (Figs. 1, 2 and 3) the other end of which is in turn pivoted to the lower end of a hand lever 54 (Fig. 1) pivoted on the machine frame at the front end thereof. This hand lever 54 has pivoted thereto a holding pawl 56 adapted to engage selectively the teeth on a segment member 58 secured to the machine frame, the pawl 56 being urged continuously in a direction to engage the teeth by a spring 60 in an arrangement in which a manually operable member 62 pivotally mounted on the lever 54 is provided to lift the pawl 56, against the resistance of the spring 60, out of engagement with the teeth on the segment 58. In the position of the lever 54 shown in Fig. 1, the pawl 56 is in engagement with the next to the last tooth at the right on the segment member 58 with the result that the lower work treating or presser member 22 is held approximately in its highest position with respect to the treating roll or cylinder 20. It will be clear upon inspection of Fig. 1 that, if the manually operable lever 54 be swung to the left in Fig. 1 to engage a selected tooth substantially midway of the segment 58, the arms 38 will be lowered toward the left in Figs. 1 and 3 thus moving the lower work treating or presser roll 22 away from the upper work treating roll 20 for inspection or repair purposes. It will be understood, furthermore, that movement of the manually operable lever 54 to the left in Fig. 1 to engage the tooth next adjacent to the one shown engaged in Fig. 1, will have the effect of letting the lower work treating roll 22 down slightly with respect to the upper work treating roll to accommodate a batch of hides or skins having a substantially greater thickness dimension than those previously treated.

In order to secure a finer adjustment of the lower roll 22 with respect to the upper roll 20, there is provided an arrangement by which a pivot block 64 (Figs. 1, 2, 3 and 15), having trunnions 65 rotatable in the lower forked end of the lever arm 42, is movable in a direction lengthwise of the link 44 by means of a screw member 66 rotatably secured to the said block and having a screw threaded part receivable in a screw threaded socket in the link member 44, said member 66 being operable by a manually movable hand wheel 68. This fine adjustment between the lower end of the lever arm 42 and the lower end of the manually operable lever 54 enables the operator, through his control also of the lever 54, to make a fine adjustment of the work treating rolls 20, 22 with respect to each other.

For driving the work treating rolls 20, 22 there is provided, in the illustrative construction (Figs. 1 and 3), a motor 70 mounted low in the frame of the machine and having secured to the armature shaft thereof a pulley 72 about which passes an endless belt 74 which also engages a larger pulley 76 mounted on a shaft 78 carried by bearings in the machine frame. Secured to the shaft 78 is a pinion 80 arranged to mesh with a gear 82 secured to a countershaft 84 to which is also secured a sprocket wheel 86 about which passes an endless sprocket chain 88 arranged to engage a sprocket 90 on the shaft 35 of the lower work treating or presser roll 22, the said sprocket chain also engaging in a reverse turn a sprocket 92 secured to the shaft 27 of the work treating roll 20. As shown, the said sprocket chain 88 also engages an idler sprocket 94 carried at the end of an arm 96 pivoted on shaft 98, said shaft being mounted on the machine frame, the said arm 96 having a bracket 100 secured thereto to which is attached one end of a spring 102 the other end of which is engaged with a screw threaded bolt 104 adjustably mounted in a bracket 106 secured to the machine frame. Through proper adjustment of the bolt 104 the tension of the spring 102 may be varied, thus adjusting the tension of the endless sprocket chain 88, keeping it in proper condition to drive the sprockets 90, 92 on the shafts of the work treating rolls 22, 20, respectively.

As indicated in Figs. 15 and 18, the lower work treating roll 22 has its blades or pressure applying ribs 26 covered with a yielding material such as felt in rather a thick layer 107, the purpose being to provide a yielding surface thereby avoiding such pressure or pinching of the work piece as would tend to injure the same. It will be understood that the yielding layer 107 also furnishes a certain accommodation for variations in the thickness dimensions of a given batch of hides or skins.

If desired, yielding surfaces may be provided on the blades 24 of the upper work treating member 20 to cooperate with the felt layer 107 which surrounds the ribs 26 of the lower work treating member 22. As shown, such yielding surface is provided by a hard and resilient member 109 (Fig. 16) secured along its inner edge 111 by screws firmly set in small spacer blocks 113, the arrangement being such that a layer of felt 115 of about the same thickness as the spacer blocks 113 may be provided to back the springy member 109 so that the latter may yield and thus avoid undue pressure on any given portion of the work piece. While screws may be used along its outer edge to maintain the member 109 against undue displacement away from the adjacent surface of the rib 26, the said screws do not prevent inward bending of the member 109 upon the yielding felt layer 115. It will be noted in this connection that only the pressure applying surface of the ribs 24 are supplied with the said resilient members 109. If desired, the strips of felt backing 115 in Fig. 16 may be omitted, as shown in Fig. 17, in which case a springy member 117 may be employed, possessing the necessary resilient qualities when used alone to press upon the work piece yieldingly during treatment thereof. Conveniently the member 117 is secured to each rib 24 with a spacer block 113 along the inner edge thereof.

Special means is provided for feeding a tanned hide or skin into place between the work treating rolls 20, 22, the said means comprising an endless conveyor belt 110 passing over an idler roll 112 (Figs. 1 and 3) mounted in bearings in the machine frame and also over a second idler roll 114, there being at the front end of the machine still another idler roll 116 (Figs. 1 and 6) for the conveyor belt which then passes upwardly to engage a driving roll 118 having a shaft 119 mounted in bearings carried by blocks 120 adjustably secured to the frame of the machine. As shown, the shaft 119 (Figs. 2 and 6) has at one end a sprocket wheel 122 fixedly secured thereto about which passes a sprocket chain 124, the said sprocket chain also passing over a sprocket 126 secured to the end of a shaft 128 to the other end of which is secured a gear 130 in mesh with a pinion 132 secured to a hollow shaft 134 rotatable on a shaft 136 mounted in suitable bearings in the machine frame. Also secured to the hollow shaft 134 is a pulley 138 (Fig. 2) arranged to be driven by a belt 140, the latter normally engaging an idler pulley 142 on the shaft 136, that is, when the conveyor belt is at rest in its initial position. Secured to the shaft 136 is a pulley 144 to which the belt 140 may be shifted when the shaft 136 is to be driven by said belt 140, which at its other end passes around a power pulley 146 (Figs. 1 and 4) fixed to the driven shaft 84.

The belt driving means described above becomes operative when the belt 140 is shifted from the idler pulley 142 to the pulley 138 which is fixed as before stated to the hollow shaft 134, this shifting of the belt 140 taking place when the operator steps on a treadle 150. While the conveyor belt 110 is thus being driven, the operator standing at the front of the machine, that is, at the right in Figs. 1 and 2, throws a hide or skin on the surface of said conveyor belt, at the same time holding one end or side edge of the skin, the result being that the hide or skin is spread out quite effectively in extended condition through frictional contact with the upper surface of the traveling belt. As soon as the skin is thus extended, the operator may depress the treadle 150 a second time to initiate driving of the conveyor belt by an entirely separate and distinct mechanism which will move the belt, with a work piece clamped thereto, not only toward the work treating cylinders 20, 22 but also away therefrom, this arrangement having the advantage of providing for treatment of the work piece while it is moving first in one direction and then in the opposite direction, such double treatment of the work piece being most effective in softening and stretching the hide or skin, in other words, in the staking thereof.

The driving mechanism for the belt mentioned in the preceding paragraph comprises a work clamping device indicated in general by reference character 160 (Fig. 1) mounted on a slide member 161 (Figs. 1, 2, 4, 5 and 6) movable back and forth in guideways 162 at the top of the machine frame. This slide comprises spaced bars 164 in the space 165 (Fig. 2) between which is receivable a roll 166 swivelly connected to special links 167 (Fig. 8) secured to an endless sprocket chain 168. Preferably, and in the construction shown, there are two sprocket chains 168, 170 (Fig. 2), each having secured thereto a roll 166 receivable in the space 165 between the bars 164. It will be readily understood that, when the chains 168, 170 are driven, the work clamping device 160 and slide 161 will be reciprocated back and forth due to the connection between the sprocket chains 168, 170 and the slide member including the bars 164. For driving the sprocket chains 168, 170 there is provided in association with each chain a sprocket wheel 172 and 174, respectively, each secured to the upper end of a vertical shaft one of which is shown at 176 in Figs. 4 and 5 for driving the sprocket chain 168. As shown, the shaft 176 has secured thereto a worm gear 178 (Figs. 4, 5 and 6) arranged to be constantly in mesh with a worm 180 secured to a stub shaft 182 journaled in bearings provided by the machine frame, the said shaft 182 having secured thereto at one end a sprocket 184 (Fig. 4) about which passes a sprocket chain 188 (Figs. 1, 2 and 6) which also engages a sprocket 190 secured to shaft 136. It will be recalled that shaft 136 is power driven through belt 140 when the latter has been shifted to engage pulley 144. The shaft 136 has also secured thereto a second sprocket 192 (Fig. 2) about which passes a sprocket chain 194 shown in Fig. 2 to be longer than the corresponding sprocket chain 188, the arrangement being such that said sprocket chain 194 engages a sprocket 196 (Figs. 2 and 6) on a shaft 198 which is similar to the shaft 180 but is located on the far side of a worm wheel similar in all respects to worm wheel 178 and secured to a vertical shaft 200 (Fig. 2) similar to the shaft 176, the purpose of this arrangement being to rotate the shaft 200 in a direction the reverse of the rotation of shaft 176. In the illustrated construction, the shaft 176 rotates in a counterclockwise direction (Fig. 2) and the shaft 200 in a clockwise direction, the result being that the rolls 166 carried by the sprocket chains 168 and 170 move toward each other, in Fig. 2, along the space between the bars 164 at the beginning of the movement by which the work clamping device 160 is moved toward the left in Figs. 1 and 2. At their other ends, the sprocket chains 168 and 170 engage sprocket wheels 202, 204, respectively (Fig. 2), the latter being supported on vertical shafts carried by journal bearings supported in the frame of the machine, as indicated in Fig. 1, said bearings being adjustable as indicated at 205 to properly tension the chains 168 and 170. When the rolls 166 turn about the sprocket wheels 202, 204, respectively, they again move lengthwise of the space between the bars 164 of the work clamping device and then, and subsequently, cause the latter to retrace its path to the right in Figs. 1 and 2, whereby the work clamping device is returned to its initial position where the driving means is automatically disconnected, as will be hereinafter described.

The work clamping device 160 includes not only the slide member 161 but also a movable clamping member 210 (Figs. 1, 6 and 9) mounted at each of its opposite ends on a lever arm 212 movable about a pivot pin 214, each lever arm also carrying a cam roll 216 on a shaft 279 which roll is adapted to ride up and down a face cam 218 carried by a stationary bracket 220 secured to a post 222 of the machine frame. It will be clear that, as the slide member 161, which serves also as a support for the work clamping device, approaches its extreme right position in Figs. 1 and 6, each roll 216 rides downwardly along the corresponding cam face 218 to lift the clamping member 210 away from the slide 161 which carries a cooperating work clamping member 224 (Figs. 5 and 6). On the other hand, when the work clamping device, including the slide member 161, starts moving toward the left in Figs. 1, 2 and 6, each roll 216 rides upwardly along its associated cam face 218 thereby permitting the work clamping member 210 to descend into work clamping relation with respect to the work clamping member 224 on the body part of the slide 161.

In the illustrated construction, there is disclosed a refinement in the work clamping means designed to obviate scuffing of the surface of the work piece when the latter is engaged by the clamping member 210. To this end the member 210 is provided with a yielding surface member 230 (Figs. 6 and 9) for direct engagement with the surface of the work piece, an additional feature of the construction residing in the provision of a toggle mechanism as part of the lever arm 212 so that the toggle may be broken upon swinging movement of the arm in a laterally upward direction away from the work piece, thereby instantaneously relieving pressure on the work piece and thus avoiding scuffing of the surface of the latter. More specifically, the work clamping member 210 is pivotally mounted at 231 on another toggle member 232 constituting part of the lever arm 212 which is pivoted at 214. Preferably and as shown, a spring 234 is interposed between adjacent parts of the toggle links 210, 232, said spring being adjustable as to tension (as indicated) and being operative to hold an edge portion of the member 210 against a shoulder 236 on the arm 212. If the member 230 should bind on the surface of the work piece, when the arm 212 starts to swing upwardly, the spring 234 will yield breaking the toggle and shortening the distance between the face of the member 230 and the pivot 214, thus relieving the pressure.

As heretofore indicated, the independent driving means and mechanism for the conveyor belt 110 and for the work clamping device 160, including the slide member 161, are controlled by the single treadle 150 (Fig. 1) through the operation of which the driving belt 140 (Fig. 2) is shifted from the idler pulley 142 to the pulley 138 for directly driving the conveyor belt 110 and subsequently from the pulley 138 directly to the pulley 144 when the operator decides to drive the conveyor belt 110 through the work clamping means by which both a given work piece and the belt 110 are clamped to the slide 161 and moved together first toward the work treating rolls or cylinders 20, 22 and then away therefrom to secure double treatment of a given portion of said work piece.

In order that the treadle 150 may accomplish the desired shifting of the belt 140, the treadle is operatively connected to a vertically arranged shipper shaft 250 (Figs. 1, 2, 6 and 9) the latter carrying fixedly secured thereto a shipper arm 252 provided with fingers 254 (Fig. 2) which engage opposite edges of the belt 140. As shown, the upper end of the treadle lever 150 is pivotally connected to a shaft 259 by an adjustably extensible link 260 (Fig. 14) having one end pivoted to the treadle and its other end swivelly connected to the under surface of a sprocket wheel 262 (Figs. 9 and 14), the said sprocket wheel being fixed to said vertical shaft 259 which is rotatable in bearings provided in the machine frame. Passing around the sprocket wheel 262 is a sprocket chain 266 which also engages a sprocket 268 secured to a sprocket shaft 269 (Fig. 11), which shaft is vertically supported for rotation in parallelism with the shipper shaft 250 and in axial alinement with a vertical cam shaft 270, in an arrangement in which the sprocket shaft 269 is integral with a disk 272 rotatable about the axis of the shaft 270 and having pivoted thereto a pawl 274 held yieldingly in engagement with a ratchet disk 276 fixed to shaft 270 and having two oppositely extending ratchet teeth 278 and 280 for selective engagement by said pawl 274. When the treadle 150 is depressed for the first time, that is, when the conveyor belt 110 is at rest, the pawl 274 is caused to move along the surface of the ratchet disk 276, through a 90° arc, until it engages the tooth 278 and thereafter moves the said disk 276 through 90°, this movement bringing the tooth 280 to a position just in front of the pawl 274 when the latter returns to its initial position shown in Fig. 14. This return movement of the pawl is accomplished by a spring 282 (Figs. 1 and 6) which pulls the treadle lever 150 back to its initial position, thereby returning the sprocket wheel 262 and the parts operatively connected thereto to the position shown in Fig. 14. Connected to the lower end of the shaft 276 is an eccentric cam 290 (Figs. 11, 12 and 13) movable in an eccentric strap 292 serving as part of a link member 294, the outer end of which is pivoted at 296 to a lever member 298 fixed to the shipper shaft 250. Hence, when the treadle 150 is first depressed by the operator to start driving of the conveyor belt 110, the shipper shaft is rotated in a clockwise direction in Figs. 2 and 12, thus effecting shifting of the belt 140 from the idler pulley 142 to the pulley 138 having driving connections through gears 130, 132 to the shaft 128 by which the conveyor belt 110 is driven independently of the work clamping means. As heretofore stated, this independent driving of the conveyor belt 110 is for the purpose of spreading out a work piece which has been thrown on the belt while the operator holds one end of said work piece. When or as soon as the work piece has been spread out satisfactorily, the operator steps a second time on the treadle 150 the result being that the pawl 274 engages the tooth 280 (which was left in front of the operative end of the pawl 274 as a result of the first depression of the treadle, as stated above) and carries the toothed ratchet member 276 through 180° so that the shaft 270 is rotated clockwise, that is, in the same direction as before, to move the eccentric 290 thereon 180° from the position it was left in at the end of the first depression of the treadle, that is, with the eccentric pointing toward the pivot 296. Hence, further rotation of the eccentric in the same direction swings the shipper shaft 250 in a counterclockwise direction in Figs. 2 and 12 and through a distance twice as great as that produced by the first depression of the treadle, the result being that the shipper moves the belt 140 from the pulley 138 across the idler pulley 142 to the pulley 144, thereby throwing in the driving mechanism for the sprocket chains 168 and 170 and thus initiating movement of the work clamping device 160, including the slide member 161. Such movement of the slide member 161 results in movement of the work clamping member 210, 230 to cooperative position with respect to the work clamping member 224 on the slide member 160, whereby both the work piece and the belt 110 are clamped to the slide member. Hence, the belt is positively driven together with the work piece to effect movement of the latter toward the work treating rolls 20, 22 and subsequently away therefrom.

When the work clamping device, together with the slide member 160 return to the position shown in Fig. 6, the work clamping device is automatically released through the cooperation of cam roll 216 and cam face 218, as before stated. In addition, the drive for the sprocket chains 168 and 170, and therefore of the slide 161 and belt 110, is also automatically terminated, this being accomplished by a cam member 300 (Figs. 2, 4, 6, 7, 9 and 12) fixed to the slide member 161 and operative to engage a roller 302 on a lever arm 304 pivoted at 306 on the machine frame and having an adjustably extensible link connection 308 with a rotary pawl carrying member 310 (Fig. 12) rotatable on the shaft 270. When the roll 302 was cammed out, against the yielding resistance of a spring 311 (Figs. 9 and 12), to the position shown in Fig. 12, the member 310, together with its pawl 312 is caused to rotate the shaft 270 through 90° by engagement of said pawl 312 with a tooth 314 on a toothed ratchet member 316 similar to the ratchet member 276 at the lower end of the same shaft. This movement of the shaft 270 brings it back to its position shown in Figs. 12, 13 and 14, such movement of the shaft 270 resulting in rotary movement of the shipper shaft 250 in a clockwise direction to bring the shipper lever 252 to the neutral position shown in Fig. 2, it being understood that this movement of the shipper 252, at the end of the return movement of the work clamping device 160 and its carrying slide 161 to their initial positions of rest, is accompanied by shifting of the belt 140 from the pulley 144 to the idler pulley 142. Hence the belt 110 is left at rest in its initial position.

In operating the illustrated machine, the worker will introduce each work piece by throwing it upon the upper surface of the conveyor belt 110 while the work clamping device is in the inoperative position shown in Figs. 1 and 6, it being noted in this connection that the conveyor belt 110 extends to the right in Fig. 1 beyond the adjacent end of the work clamping device 160 and its supporting slide member 161. The worker may then step on the treadle 150 thereby causing operation of the belt driving means with the result that the upper run of the belt moves toward the work treating rolls 20, 22. During this time, the operator retains control of the work piece, usually holding one end thereof so that such work piece is spread out in fully extended condition due to the friction of the traveling belt. As soon as he is satisfied with the extended condition of the work piece, the treadle 150 is again depressed, thereby disconnecting the belt driving means and initiating operation of the driving mechanism for reciprocation of the slide 161 through the endless sprocket chains 168, 170. As soon as the slide 161 starts moving in the direction of the rolls 20, 22, the work clamping device including the pad member 230 is lowered upon the work piece to clamp the latter to the belt 110 and to clamp both belt and work piece to the work clamping surface 224 on the slide member 161. As before stated, such clamping of the belt to the slide 161 has the effect of driving the belt 110 through the slide 161. Hence the belt is moved first toward the work treating rolls 20, 22 and then away therefrom during reciprocation of the slide. During the first part of this movement the work piece is fed into the bite of the rolls 20, 22 while the latter are revolving in the direction of the arrows (Figs. 1 and 3). The said rolls continue their rotation in the same direction while the work piece is drawn back again as the slide 161 moves toward the right in Figs. 1 and 3, and finally returns to its initial position in which the work clamping member is released and the belt brought to rest. The operator then withdraws the work piece, reverses it end to end, and introduces it a second time into the machine to complete the treatment thereof. It will be seen that all portions of a work piece are thoroughly staked, by being twice operated upon, without subjecting the work piece to such pressure as would be likely to result in injury.

Having described our invention, what we claim as new and desire to secure by Letters Patent of the United States is:

1. In a machine for operating upon hides, skins, and leather, a rotary work treating member, a movable member cooperating with the rotary member to effect treatment of both sides of a work piece, means upon which such work piece may be spread, such means being spaced from the treatment zone between said work treating members during treatment of the work piece and arranged for feeding the work piece to the said members and for feeding it in the reverse direction during continued operation of the rotary member, whereby said work piece receives treatment during movement of the work piece in both directions, and means for clamping the work piece relative to the work feeding means.

2. In a machine for operating upon hides, skins, and leather, a pair of cooperating rotary work treating members between which a work piece may be introduced for treatment, and means spaced at all times from the treatment zone between said rotary members for holding and also moving such work piece into the bite of said rotary treating members and then in the opposite direction with respect to said members during continued operation of the latter, whereby the work piece receives double treatment, said spaced means including a surface for supporting the work piece in extended condition.

3. In a machine for operating upon hides, skins, and leather, a pair of cooperating rotary work treating members between which a work piece is introduced for treatment, an endless conveyor belt for supporting a work piece in extended condition, said conveyor belt being spaced with respect to said members and having its operative work supporting run ending closely adjacent said members, a work clamping device for holding the work piece against displacement with respect to said conveyor belt, and means for driving said conveyor belt and work clamping device toward the rotary members to feed the work piece into the bite of said members for treatment thereby and then in the reverse direction to feed the work piece away from said rotary members during continued operation of the latter upon said work piece, whereby the latter receives double treatment by said members.

4. In a machine for operating upon hides, skins, and leather, a pair of upper and lower rotary work treating members between which a work piece may be introduced for treatment, and motor driven means for spreading and retaining such work piece including a work clamping device, said means being arranged to move such work piece into the bite of said rotary treating members and then in the opposite direction with respect to said members during continued operation of the latter whereby the work piece receives double treatment on both sides.

5. In a machine for operating upon hides, skins, and leather, a pair of meshing upper and lower rotary work treating members between which a work piece is introduced for treatment by both rotary members, a conveyor belt for supporting a work piece in extended condition, a work clamping device for holding the work piece against displacement with respect to said conveyor belt, and means for driving said conveyor belt and work clamping device toward said rotary members to feed the work piece by itself into the bite of said meshing members for treatment thereby and then in the reverse direction to feed the work piece away from said rotary members during continued operation of the latter whereby said work piece receives double treatment by said members.

6. A machine constructed in accordance with claim 5 characterized by the fact that means is provided for automatically rendering said work clamping device inoperative upon its return to its initial position.

7. In a machine for operating upon hides, skins, and leather, a pair of upper and lower rotary work treating members between which a work piece is introduced for treatment, a conveyor belt operative to support a work piece in extended condition, means for driving said conveyor belt to cause the upper run thereof to move toward said rotary members thus effecting spreading out of a work piece while the rear end thereof is held by the operator, a work clamping device operative to clamp the work piece against said conveyor belt, mechanism for driving said clamping device whereby said conveyor belt and the work piece clamped thereon are moved toward said rotary members, and means under manual control for initiating operation of the belt driving means and subsequently to initiate operation of the driving means for said work clamping device and the simultaneous disconnection of the driving means for the said belt.

8. A machine constructed in accordance with claim 7 in which means is provided under control of a treadle for shifting from the driving means for the belt to the driving mechanism for the work clamping device.

9. A machine constructed according to claim 7 in which said work clamping device, together with the clamped work piece and belt, are driven by endless chains turning about sprocket wheels at the upper ends of driven vertical shafts.

10. In a staking machine for tanned hides and skins, a work treating roll having helically arranged blades extending in opposite directions from a substantially median point in the length of the roll, said blades being substantially rigid but having resilient working faces, a cooperating roll having helically arranged blades covered with yieldable material to engage the opposite surface of the work piece and to press it into engagement with the blades of the work treating roll, and means for feeding the work piece into the bite of said rolls and then in the reverse direction during continued rotation of said rolls in work treating operations upon said work piece, whereby the work piece receives treatment while moving in reverse directions.

11. In a staking machine for tanned hides and skins, a work treating roll having helically arranged blades extending in opposite directions from a substantially median point in the length of the roll, said blades being substantially rigid but having hard and resilient working faces, a cooperating presser roll also having helically arranged blades to engage the opposite surface of the work piece and to press it into engagement with the blades of the work treating roll, and a covering for the work contacting surfaces of the helical blades of the presser roll, said covering including yielding material to provide for variations in the thickness dimensions of various portions of the work piece undergoing treatment and to avoid undue pressure at any given portion of a work piece at the moment between blades of the cooperating rolls.

12. A machine according to claim 11 in which the covering for the work contacting surfaces of the helical blades of the presser roll includes a layer of yielding felt material.

13. In a staking machine for tanned hides and skins, a work treating roll having helically arranged blades extending in opposite directions from a substantially median point in the length of the roll, said blades being substantially rigid and having working faces including yielding spring means, a presser roll having helically arranged blades arranged to press a work piece into engagement with the spring means of the work treating roll, and a covering for the helical blades of the presser roll, said covering being of yielding material.

14. In a machine for operating upon hides, skins, and leather, a rotary work treating tool, means cooperating with the rotary tool to effect treatment of the work piece, a conveyor belt for supporting a work piece in extended condition, a work clamping device operative to hold the work piece aaginst displacement with respect to the conveyor belt, a treadle, means under the control of the treadle for driving the conveyor belt, such movement of the belt serving to extend the work piece fully in the direction of movement of the belt while said work piece is held at one end substantially stationary in space, means for operating the work clamping device to cause the latter to clamp the work piece to the belt and to move the latter toward the rotary tool, said driving means for the belt and said operating means for the work clamping device comprising a driving belt and pulleys spaced from each other, an idler pulley between said driving pulleys, a shipper device to shift said driving belt from the idler pulley to one of the other pulleys to initiate driving of the conveyor belt, treadle controlled means to operate the shipper device to move said driving belt from the driving pulley for the conveyor belt across the idler pulley to the driving pulley for the work clamping device, successive depressions of the treadle having the effect of moving said shipper device in opposite directions, and cam means movable with the work clamping device to move said shipper device to neutral position thereby to shift said driving belt to the idler pulley upon return of the work clamping device to initial position.

15. A machine constructed according to claim 14 in which a ratchet member is provided in operative relation to said shipper device, and means operated by the treadle to move said ratchet member thereby to move the shipper member thus initiating driving of the conveyor belt, means to return the ratchet member and the treadle to their initial positions, subsequent operation of the treadle and of said ratchet member in the same direction serving to move the shipper device in the reverse directions from one driving pulley to the other thus initiating driving of the work clamping device to feed the work piece in said reverse directions.

16. A machine constructed according to claim 14 in which a second ratchet member is provided in operative relation to said shipper, and means operated by the treadle to move the first-mentioned ratchet member thereby to move the shipper member thus initiating driving of the conveyor belt and subsequently driving of the work clamping device following a second operation of the treadle, means operated by said cam on the work clamping device to operate said second ratchet member thereby to move the shipper to neutral position and at the same time condition the first-mentioned ratchet member so that subsequent operation of the treadle will initiate driving of the conveyor belt.

17. In a machine for operating upon hides, skins, and leather, a rotary work treating tool, means cooperating with the rotary tool to effect treatment of the work piece, a conveyor belt for supporting a work piece in extended condition, a work clamping device operative to hold the work piece against displacement with respect to the conveyor belt, means for driving the conveyor belt, such movement of the belt serving to extend the work piece fully in the direction of movement of the belt while one end of the work piece is held substantially stationary in space, means for operating the work clamping device to cause the latter to clamp the work piece to the belt and to move the latter in directions toward and from the rotary tool, said driving means for the belt and for the work clamping device comprising a power shaft, a treadle under control of the operator having connections to initiate driving of the conveyor belt from said power shaft and subsequently driving of the work clamping device from said power shaft, and cam means movable with the work clamping device and arranged through said connections to render the power shaft inoperative for the purposes mentioned upon return of the work clamping device to initial position.

18. In a machine for operating upon hides, skins, and leather, a rotary work treating tool, means cooperating with the rotary tool to effect treatment of the work piece, a conveyor belt for supporting a work piece in extended condition, a work clamping device operative to hold the work piece against displacement with respect to the conveyor belt, a manually operable controller member, means for driving the conveyor belt, such movement of the belt serving to extend the work piece fully in the direction of movement of the belt while one end of said work piece is held substantially stationary in space, means for operating the work clamping device to cause the latter to clamp the work piece to the belt and to move the latter in directions toward and from the rotary tool, said driving means for the belt and said operating means for the work clamping device comprising pulleys spaced from each other, an idler pulley between such driving pulleys, a source of power comprising a driving belt engageable with said idler pulley when the machine is not working, a shipper device to shift said driving belt, said controller member having operative movement in one direction only and having connections to operate the shipper device to move said driving belt from the idler pulley to the driving pulley for the conveyor belt and subsequently across the idler pulley to the other driving pulley to operate the work clamping device, and cam means movable with the work clamping device to shift said driving belt to the idler pulley upon return of the work clamping device to initial position.

19. In a machine for operating upon hides, skins, and leather, a rotary work treating tool, means cooperating with the rotary tool to effect treatment of the work piece, a member for supporting a work piece, a work clamping device, means for moving said work supporting member, mechanism for operating the work clamping device to cause the latter to clamp the work piece to the work supporting member and to move the latter toward and from the rotary tool, said moving means for the work supporting member and said operating mechanism for the work clamping device comprising pulleys spaced from each other, an idler pulley between said driving pulleys, a driving belt for said pulleys, a shipper device to shift the driving belt from the idler pulley to one of the other pulleys to initiate movement of the work supporting member, and treadle controlled means to operate the shipper device to move said driving belt from the driving pulley for the work supporting member across the idler pulley to the driving pulley for the work clamping device, said treadle controlled means including an eccentric rotatable always in the same direction to cause movements of said shipper device in opposite directions during successive depressions of the treadle by the operator.

20. In a machine for operating upon hides, skins, and leather, a rotary work treating member, a support for a work piece, means for moving said support, a mechanism for moving said work support toward and from said rotary member, a driving mechanism including an idler pulley, a driving pulley on each side of the idler pulley and a driving belt shiftable from one pulley to another in the set of three pulleys, a shipper device for said belt including an eccentric rotatable always in the same direction to cause movement of the shipper device to shift the driving belt in opposite directions, connections between the work support moving means and one of the driving pulleys and also between the work support moving mechanism and the other driving pulley, and a treadle having connections to said shipper device and operable upon successive depressions thereof to effect shifting of said driving belt in opposite directions to cause in succession driving by said pulleys of the work support moving means and the work support moving mechanism.

21. In a machine for treating materials such as hides, skins, or leather, a main machine frame, a pair of meshed rotary work treating rolls mounted on said frame, said rolls being provided with yielding surfaces, a conveyor belt movable on said frame for spreading out a work piece while said work piece is held at one edge by the operator, means to clamp the spread out work piece to the belt, means for driving the belt to feed the work piece to the bite of the rolls and then to withdraw it therefrom and to return the work piece toward the operator's position, and means to release the clamping means during the return movement of the work piece.

CUTLER D. KNOWLTON.
DAVID EDGAR.